INVENTOR.
BY William F Davis

United States Patent Office 3,110,254
Patented Nov. 12, 1963

3,110,254
MEANS FOR REGULATING FLUID CONTROL APPARATUS
William F. Davis, P.O. Box 179, Windsor, N.J.
Filed July 24, 1959, Ser. No. 829,352
15 Claims. (Cl. 101—365)

The present invention relates to new and useful improvements in the method and means of regulating or adjusting of fluid apportioning and feeding means.

Objects and advantages of the invention will be set forth in part hereinafter and in part will be obvious herefrom, or may be learned by practice with the invention, the same being realized and attained by the instrumentalities and combinations pointed out in the appended claims.

The invention consists in novel parts, constructions, arrangements, combinations and improvements herein disclosed and described.

The accompanying drawings, referred to herein and constituting a part hereof, illustrate the embodiments of the invention, and together with the description serve to explain the principles of the invention.

The present invention has for its object the provision of a novel and improved method of regulating and adjusting fluid feeding controls and the means to accomplish this new and improved method of regulation of fluid control means.

The prime object of the present invention is to provide a method and means to regulate a plurality of fluid feeding control means, individually, in predetermined sets and in random combinations in accordance with the associated process requirements.

A second object of the invention is to provide a method and means to regulate the said plurality of fluid feeding controls from a location which may be remote from the fluid feeding mechanism.

A further object of the present invention is to provide a means whereby said remote regulating means may be in a central location with the ability to adjust the fluid feeding controls of a plurality of machines or units of a machine.

A further object of the invention is to provide an efficient and rapid method and means to regulate and set a plurality of fluid control means.

A still further object of the invention is to provide a method and means to indicate at the regulation location when the fluid control is shut off or at extreme limit of its adjustment.

Other objects and advantages of the invention will be apparent to those skilled in the art.

While the invention is susceptible of various modifications and alternate constructions and uses, I have depicted in the drawings and disclosed in detail herein preferred embodiments of the invention.

It is to be understood, however, that the broader aspects of the invention are not limited to the specific mechanism shown and described but departures may be made therefrom within the spirit and the scope of the accompanying claims without sacrificing the concomitant benefits and advantages. Therefore, I do not intend to limit the invention by the aforementioned drawings and description but intend to cover all modifications and alternate constructions falling within the spirit and scope of the invention as expressed in the appended claims.

Referring to the drawings.

It is understood that the foregoing description and the following detailed description as well are exemplary and explanatory of the invention but are not restrictive thereof.

In the following, the invention will be disclosed as applied to a printing press' inking system and therefor the terminology will conform to that employed in such equipment.

Figure 1:
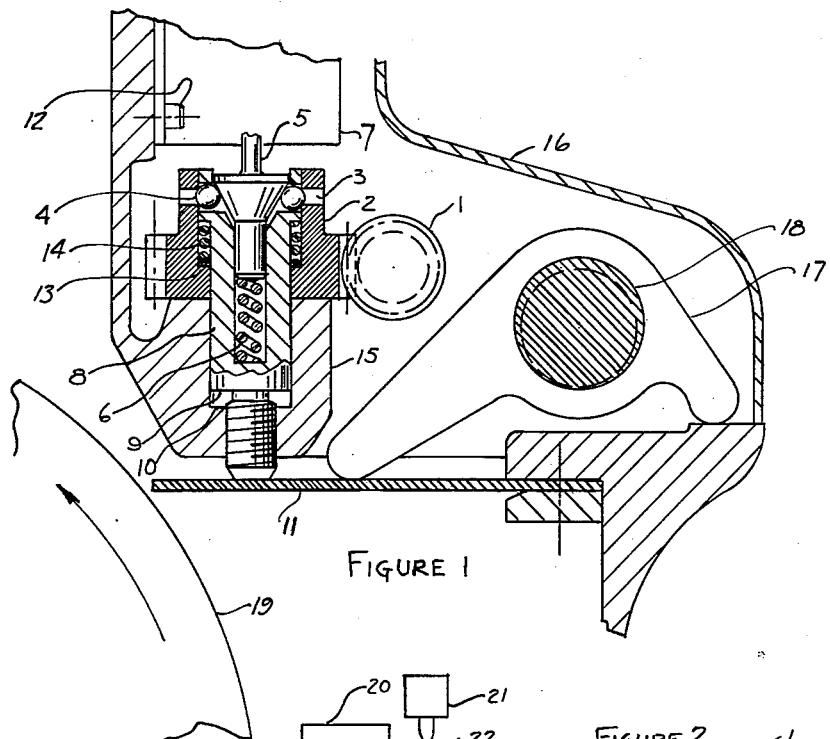
FIGURE 1 is a cross section thru one of the plurality of fluid feeding controls in a machine unit.

In accordance with the illustrative embodiment disclosed in FIGURE 1 the fluid or ink control means consists of a doctor blade 11 which meters the thickness of the ink film on the fluid supply roll 19. In such equipment as printing presses, it is common to employ a plurality of adjusting screws to deflect the doctor blade toward the fluid supply roll. These adjusting screws 8 are distributed along the length of the doctor blade so that each screw controls a lateral portion of the ink feed; in publication work these lateral widths are referred to as columns. Thus there is a control screw 8 for each column. In the past these screws were adjusted by manually turning the screw at its location on the doctor blade. Due to the difficulty of access to the screw and many other factors the method of adjustment was improved as depicted in Wood, U.S. Patent 2,027,850. Further advances were made as shown in U.S. Patent 2,497,648 of Worthington for the more efficient adjustment of the said ink feed controls. These works while advances in their time had not attempted to provide any method of collective control of the individual column adjustments in functional sets. Further they were simply devices to bring the ink control to an accessible location on the unit which printed a web. Still further, these devices did not provide any means to rapidly and efficiently adjust ink feed setting from a location where the errors in such settings could be detected.

In the work of Lougee and Horton, U.S. Patent 2,183,720 the need for remote ink control regulation was realized and adjustment means for ink pumps was disclosed. Unfortunately, the complexity of the equipment and its economic cost compared to the benefits have severely limited its employment. Further, the system depicted while affording remote control of the ink feed of any of the printing units required the adjustment to be made one unit at a time and without the benefit of collective adjustment of predetermined sets of ink feed controls. The system further provided for the adjustment of an ink feed column at a time, thereby correcting the incorrect ink control setting in a slow time consuming manner. Naturally, this was equivalent to the at the unit manual adjustment; therefore, the system only effected a saving of imperfect product produced while traveling to and from the unit control and the point of inspection of the result of the adjustment made.

Now, with these main points depicted above in mind, it will be seen that the present invention provides the instant adjustment or regulation of a plurality of ink columns which may be selected at random according to the needs of the printed product. Further, the tone of an entire set of columns, such as compose a page, may be collectively adjusted for tonal depth. Still further, these adjustments are effected in predetermined increments, positive or negative, and there is visual indication when a control screw has been displaced thru its total excursion.

As depicted in the illustrative embodiment of FIGURE 1, an adjusting screw 8 is provided with a cylindrical body diameter to support the worm gear 2, and a threaded diameter coacting with threads in rail 15 to axially displace said screw 8 when said screw is rotated. A worm gear 2 is rotatably mounted on the body diameter of screw 8 and kept in axial position against the rail 15 by the spring 14 applying thrust thru washer 13. The worm gear 2 is driven by the worm 1. Worm gear 2 is provided with a plurality of holes 3 in its hub, said holes 3 coact with balls 4 and the actuator pin 5. The upper end, or head of the screw 8 is provided with a cross hole which accommodates the balls 4 with a free sliding fit. The actuator pin 5 is slidably mounted in the screw 8 and has a spring 6 driving it upward out of the screw. The pin 5 is retained in the screw 8 by contact with the solenoid 7, which is secured to the rail 15 with screws 12. As depicted, the holes 3 permit the balls 4 to only partially enter into said holes 3. Now when the solenoid is de-energized the pin is maintained in an axial position which permits the balls 4 to remain fully in the cross hole in the screw head and the worm gear simply rotates about the screw 8.

However, when the solenoid 7 is energized it drives the pin 5 down into the screw 8 forcing the balls 4 to engage the holes 3 in the worm gear as shown in FIGURE 1. Now when the worm 1 drives the gear 2, the torque is transmitted to the screw thru the balls 4 and the screw 8 is advanced, or retarded, in its relationship to the rail 15 and the doctor blade 11 depending upon the direction of rotation of the worm 1.

The screw 8 is limited in its travel by the abutment 10 which is located to engage the shoulder 9 on the screw 8 when the screw has advanced to a position which causes blade 11 to effect cut off of the ink feed.

Figure 2:
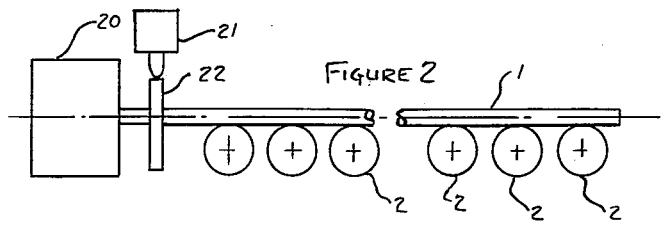
FIGURE 2 is a diagrammatic presentation depicting the actuating means of a plurality of fluid feeding controls.

In FIGURE 2 the worm gears 2 of a plurality of column screws 8 are shown as laterally dispersed (across the width of the printing unit) and engaging with the driving worm 1. FIGURE 2 also depicts a motor 20 coupled to the worm 1, said motor capable of rotating in either direction predicated upon switches 23 and 24. A cam 22 is also located upon the motor output shaft for the purpose of cyclically actuating the switch 21.

It is clear at this point that the energizing of any one or combination of solenoids will actuate the associated screws 8 instantly in the direction the motor drive is running. Since the switches to actuate the solenoid may be located at the folder or other inspection location and thereby afford almost instant ink control correction, a heretofore unrealized material saving can be attained. The magnitude of this saving can be realized when considering that over 19 newspapers are produced per second by current printing equipment.

Figure 3:
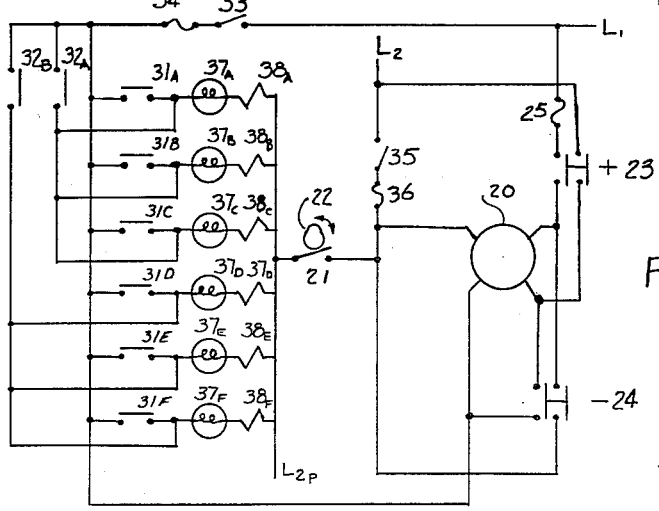
FIGURE 3 is a schematic of the regulating means operating system and circuitry.

FIGURE 3 is a schematic of the control system of the present invention. The diagram for simplicity depicts only two sets of three adjusting screw controls. In actual practice a single printing unit would probably embody 8 sets of 8 columns of the number of screws 8 to be adjusted or regulated. Naturally the complete control would encompass a multiplicity of such control groups, or master sets, one for each unit. As depicted in FIGURE 3 the line L1 is connected thru line switch 33 and overload protection 34 to a plurality of switches 31. Each switch 31 is connected to a lamp 37 of the glow type and a solenoid coil 38 of a solenoid 7 and then to the common line designated as L2p. The switches 31 are of the maintain contact type thereby permitting the connecting of any random combination of solenoids 7 to the line L1. Further, since it is often necessary to adjust all the ink control screws 8 the same amount to increase or vary the tonal density of an image being reproduced, switches 32 are provided. These switches control sets of solenoids as depicted thereby affording page wide ink control regulation or adjustment in predetermined sets of ink control screws.

The motor 20 is connected to switches 23 and 24 and to the line. Motor 20 is constructed such that its rotation is instantly reversed by reversal of current flow thru one of its windings. The control of the direction of rotation of the motor 20 is afforded by the momentary contact switches 23 and 24. Line L2 is connected to L2p by switch 21 which is actuated, or cyclically closed by the cam 22. Operation of the above disclosed controls is as follows. The ink columns or pages requiring a change in setting are energized by depressing the associated push button switch 31, then the switch 23 is depressed rotating the motor effecting instant adjustment of a plurality of ink controls, say in the sense of increasing the ink fed. If it were desired to decrease the ink fed switch 24 would be depressed. The indicator glow lamps 37 blink with each energization of its associated coil, i.e., upon closure of switch 31, and 21. Now the function of switch 21, which is only required in ink control systems which meter very fine films of ink, is to cyclically energize the coils 38 of the solenoids 7 so the screws 8 are driven only a portion of the excursion of the wormwheel per motor revolution. This is possible since the worm gear hub has a plurality of holes 3 and may be engaged by balls 4 in a number of angular positions. Hence it is possible to attain very small increments of advance of the screw 8 (in the order of 0.0001 inch).

When the screws 8 are driven to cut off and the shoulder 9 bottoms on the abutment 10 the screw will not rotate thereby increasing the reaction force on the balls 4 at the holes 3. The proportions of the coacting elements are such as to result in balls 4 forcing the pin 5 to move upward against the force of the solenoid 7 in a rapid cyclic oscillating manner in accordance with the passage of the plurality of holes 3 past the balls 4. This forced displacement of the solenoid armature results in relatively large changes of the current flowing thru the coil 38 of the armature.

Naturally, since the glow lamp is connected to the coil, the lamp flickers when this condition occurs and notifies the operator at the remote location where the regulation means is positioned that the column is at shut off. The same condition results when the adjusting screw 8 is driven to an abutment corresponding to the maximum ink feed position of the said screw 8.

Mechanism depicted by characters 17 and 18 are part of a previous application.

Thus, the subject invention provides method and means to regulate the ink feed of a plurality of printing units in individually controlled columns of random selection and predetermined page groups at a remote location for centralized control and effects the corrective action or regulation in unison with a minimum of lost time and an indication of the extreme position of said ink control means.

From the foregoing it is clear the regulation of the ink control means may be made in precise increments from the remote location, i.e., as the motor energizing switch 23 or 24 is depressed the ink columns which are adjusted blink the glow lamps associated with the particular columns. Upon cut off the lamps blink or flicker at a rapid rate depicting the difference from a cut off condition and an adjustment of an increment. In some cases it is desired to have the depression of switches 23 or 24 make only one increment adjustment, as opposed to the recurring increment adjustment depicted above. This is accomplished by the application of interlock between the switch 21 and the switches 23 and 24 which will stop the motor after one revolution as measured by the pulse from the cam switch 21.

It is obvious that while the above has been disclosed as an electric powered and controlled system that it is a simple matter to substitute pneumatic components and attain the same benefits and advantages.

Referring to FIGURE 3 of the drawings which depicts an electrical schematic of the actuating mechanism, a component for component substitution may be made to convert the system to a pneumatically operated control. The following illustrates one form of substitution.

The switches 31, 32 and 33 may be replaced with three way valves which would connect component 38 either to the line, as when actuated, or the atmosphere when deactuated.

The coils 38 of solenoid 7 may be air chambers or cylinders and the lamps 37 may be pressure indicators or gauges. The line L1 would then be the air supply line or power source for operating the system.

In such substitution line L2p would be eliminated since the air cylinders 7 would terminate their individual circuits and would be deactivated with the three way valves 31, 32 or 33.

Further detailed substitution could be effected, for example, by replacing the pressure gauges 37 with pressure switches and thence illuminate lamps or other devices.

It is equally obvious that the above invention may be applied to regulate an ink pump of, or similar to, the Schmidt 1,348,900 or Davis 2,730,947 by driving the control screws of these devices with the means disclosed in the present invention.

What I claim is:

1. In a fluid dispensing, or apportioning mechanism, a regulating means comprising in combination a screw which controls the fluid dispensement or apportionment by the axial movement of said screw, said screw provided with at least one hole normal to its axis and a second hole coincident with its axis; a set of balls freely movable in the said hole normal to the axis of said screw; a pin with a tapered section disposed with its axis coincident with the axis of said screw and with its tapered section positioned to contact said balls and upon axial displacement of said pin in one direction to displace said balls partially from the hole in the screw containing said balls; a rotatable driving member having a bore surrounding the portion of said screw containing said balls, a plurality of indentations in said driving member's bore, said indentations formed to cooperatively engage the said balls when said balls partially protrude from the hole in said screw; a resilient means to displace said pin into engagement with said balls and force said balls partially from the hole containing said balls and into engagement with said indentations in the bore of said rotatable driving member for coacting therewith to transfer the driving torque from said rotatable driving member to said screw thru said balls.

2. In a printing press having an ink feeding and apportioning control, and regulating and adjusting means to operate said control; said regulating and adjusting means comprising, in combination, a rotatable screw which controls the ink dispensement and apportionment by the axial displacement of said screw; said screw provided with a hole normal to its axis and a hole coincident with its axis; a set of balls freely movable in said hole normal to the axis of said screw; a pin with a tapered section disposed with its axis coincident to the axis of said screw and disposed in the hole in said screw so that the tapered section of said pin will contact said balls and upon axial displacement of said pin in one direction shall displace said balls partially from the hole in said screw containing said balls and conversely, the radial displacement of said balls toward the tapered section of said pin shall axially displace said pin in the opposite direction; a rotatable driving member having a bore surrounding the portion of said screw containing said balls, a plurality of axial indentations in said member's bore; said indentations spaced and formed to cooperatively engage with said balls when said balls partially protrude from the hole containing the said balls in said screw; and resilient means to engage said pin with said balls thereby forcing said balls into cooperating engagement with the said rotatable driving member effecting transfer of the driving torque from said driving member through said balls to said screw and effecting an adjustment of said ink feeding and apportioning control.

3. In a printing press, a regulating means as set forth in claim 2 and comprising in combination therewith a shoulder on said screw; and a fixed abutment positioned to coact with said shoulder when said screw has reached the limit of excursion effecting functional adjustment by said regulating means.

4. In a printing press having a plurality of ink feeding and apportioning controls, a plurality of regulating means as set forth in claim 2, wherein the resilient means of each of said plurality of regulating means may be individually and selectively applied.

5. In a printing press, a plurality of regulating means according to claim 4 and in combination therewith a plurality of activating means, one activating means for the resilient means of each regulating means; said activating means, which may be at a location remote from said ink feeding and apportioning controls of said printing press, controlling only its associated resilient means which is thereby remotely energizable; each of the said activating means being independently and selectively applied.

6. A regulating means as set forth in claim 5 wherein said resilient means comprises an electromagnetic transducer means which converts an electrical signal to a resilient force; and in combination therewith a plurality of electric lamps, one lamp for the activating means of each resilient means of each regulating means; each said lamp, which may be remote from said resilient means, arranged to sense variations of energy flowing thru said resilient means, and to indicate said variations by a variation in the light emitted from said lamp; each said lamp individually and independently indicating the energy flowing thru its associated resilient means.

7. In a printing press, a plurality of regulating and actuating means as set forth in claim 5, wherein each said resilient means of each regulating means consists of a pneumatic cylinder, and each activating means comprises a three way pneumatic valve for actuating and deactuating its associated pneumatic cylinder.

8. In a printing press, a plurality of regulating means and activating means according to claim 5, the individual regulating means of said plurality being grouped into sets, such as comprise a page width of ink feed controls for example; and a single collective activating means which energizes the remotely activated resilient means of each of the regulating means in each set; each of said sets of regulating means provided with a single collective activating means for that set; thereby providing both individual remote regulation means for each individual ink control means and collective regulation of sets of ink control means.

9. In a printing press, a plurality of regulating and activating means according to claim 8, each said activating means being of the maintaining type, i.e. each said activating means maintaining its associated resilient means, or set of resilient means, energized when actuated until said activating means is deactuated; a bidirectional remotely energized power means to motivate said rotatably driving member in either of two directions; and a pair of momentary type activating means for energizing said bidirectional power means in one direction or the other; thereby affording individual random selection of said regulating means to be adjusted, as well as selection of said sets of regulating means to be adjusted and effecting said adjustment in unison upon activation of said bidirectional power means.

10. In a printing press, a plurality of regulating and activating means according to claim 5, each of said activating means being of the maintaining type, i.e. each said activating means maintaining its associated resilient means energized when actuated until said activating means is deactuated; a bidirectional remotely energized power means to motivate said rotatably driving member in either of two directions; and a pair of remotely located momentary type activating means for energizing said bidirectional power means in one direction or the other; said maintaining type activating means selective in any required random combination and when so actuated providing adjustment in unison of the ink apportioning means when said momentary type activating means is actuated; said adjustment performed in the increasing or decreasing sense in accordance with the direction of energization of the bidirectional power means by the said momentary type activating means.

11. In a printing press, a plurality of regulating means and activating means according to claim 10, and comprising, in combination, therewith, a deactivating means which is cyclically actuated at a high frequency, said means connected in series with said activating means; thereby providing short intervals of actuation of said resilient means of said regulating means to afford small increments of adjustment.

12. A machine having a plurality of control means comprising, in combination, a regulating means for adjusting each said control means, each regulating means actuated by at least one activating means, which may be at a location remote from said control means; said activating means individually selective at random; a cyclically actuated deactivating means connected in series with said activating means and a plurality of indicator means, one for each regulating means, each said indicator means announcing the activation of its associated regulating means; a bidirectional power means, which may be remotely energized, maintaining the transmission of power to each of said regulating means which has been actuated by said activating means, thereby cyclically adjusting said control means with each said regulating means which has been activated and announcing each increment of adjustment of each control means being regulated until said regulating means is deactuated.

13. A regulating means for adjusting a control means which comprises, in combination, a screw provided with at least one hole normal to its axis and a second hole coincident with its axis; said control means adjusted by the axial and rotational displacement of said screw; a set of balls freely movable in the said hole normal to the axis of said screw; a pin with a tapered section disposed with its axis coincident with the axis of said screw and with its tapered section positioned to contact said balls and upon axial displacement of said pin in one direction to displace said balls partially from the hole in the screw containing said balls; a rotatable driving member having a bore surrounding the portion of said screw containing said balls, a plurality of indentations in said driving member's bore, said indentations formed to cooperatively engage said balls when said balls partially protrude from the hole in said screw; a resilient means to displace said pin into engagement with said balls and force said balls partially from the hole containing said balls into engagement with said indentations in the bore of said rotatable driving member for coacting therewith to transfer a driving torque from said rotatable driving member to said screw thru said balls; and an excursion limit means to restrict the travel of said screw; said driving means automatically disengaged by the establishment of a resisting torque beyond the torque capacity of the positively engaged coupling means; said regulating means thereby adjusting said control means only within the limits established by said excursion limit means, regardless of the continuous motion of the driving means.

14. A regulating means for adjusting at least one control means comprising, in combination, a displaceable member for each control means, each said member individually and independently adjusting its associated control means in accordance with the position of said member; a reversible driving means; a clutching means for each said control means, which may comprise said displaceable member, each clutching means positively engaged by a resilient means; at least one activating means, which may be at a location remote from said resilient means, for actuating each of said resilient means of each clutching means; each said clutching means when engaged individually transferring force and motion from said driving means to said displaceable members; each displaceable member provided an excursion limit means to restrict the travel of said members in at least one direction of adjustment; said resilient means repressed by the inhibited motion of said displaceable member, thereby effecting automatic disengagement of said positive clutching means permitting the continued motion of said driving means; said clutching means transferring force to displace said member while said resilient means is actuated and repressed.

15. A regulating means as set forth in claim 14 which also comprises, in combination therewith, at least one indicating means for each of said resilient means, said indicating means adapted to be remote from said resilient means and to indicate when said resilient associated with said indicating means is actuated, said indicating means further adapted to indicate when said resilient means is repressed by the restricted movement of said displaceable member associated with said resilient means.

References Cited in the file of this patent

UNITED STATES PATENTS

| 817,309 | Flynt | Apr. 10, 1906 |
| 1,275,642 | Bechman | Aug. 13, 1918 |
| 2,274,166 | Roesen | Feb. 24, 1942 |
| 2,497,648 | Worthington | Feb. 14, 1950 |
| 2,772,578 | Kling | Dec. 4, 1956 |